United States Patent [19]
Vancsik

[11] Patent Number: 5,159,754
[45] Date of Patent: Nov. 3, 1992

[54] PROCESS FOR PRESS FITTING A VEHICLE WHEEL HUB INTO AN INTEGRAL BEARING

[75] Inventor: Frank J. Vancsik, Gross Pointe, Mich.

[73] Assignee: The Budd Company, Troy, Mich.

[21] Appl. No.: 672,679

[22] Filed: Mar. 20, 1991

[51] Int. Cl.⁵ .............................................. B23P 19/02
[52] U.S. Cl. .............................. 29/898.07; 29/898.09; 29/525; 29/802
[58] Field of Search ............ 29/898.07, 898.09, 898.1, 29/458, 525, 724, 802

[56] References Cited

U.S. PATENT DOCUMENTS

| | | | |
|---|---|---|---|
| 2,427,072 | 9/1947 | Rubin | 29/898.07 |
| 3,052,955 | 9/1962 | McAndrews et al. | 29/898.07 |
| 4,214,363 | 7/1980 | Rickrode et al. | 29/802 |
| 4,841,622 | 7/1989 | Murano et al. | 29/525 |

FOREIGN PATENT DOCUMENTS 956220  9/1982  U.S.S.R. .................. 29/802

Primary Examiner—P. W. Echols
Assistant Examiner—David P. Bryant
Attorney, Agent, or Firm—Harness, Dickey & Pierce

[57] ABSTRACT

An assembly machine and method for assembling an integral bearing unit onto a motor vehicle wheel hub. The assembly process involves applying an axial force onto the elements causing the elements to be pressed together. In order to avoid localized brinelling of the surfaces of the bearing including the faces and rolling elements, the hub is rotated during the pressing operation to cause the forces to be spread over areas of the rolling elements and bearing races. The machine and method further incorporate a sensor to detect improper position or installation of the bearing on the assembly tooling and a load cell to monitor pressing loads enabling detection of improper part fit or other defects.

4 Claims, 3 Drawing Sheets

PROCESS FOR PRESS FITTING A VEHICLE WHEEL HUB INTO AN INTEGRAL BEARING

BACKGROUND AND SUMMARY OF THE INVENTION

This invention relates to an assembly process and machine for press fitting a motor vehicle hub and wheel bearing together during production.

Some motor vehicle wheel hub assemblies incorporate a hub which must be press-fit into a bearing. One type of bearing unit in use today is a so-called integral bearing in which two sets of bearing elements are unified into a single assembly which is press-fit with the hub. Integral bearings provide a number of significant advantages, including the ability to prepackage and assembly the bearings at a venders facility ready for immediate installation and use by the vehicle manufacture. Integral bearing units are further protected from contamination since they are sealed prior to shipment. However, a particular concern in using these bearing units relates to their assembly with the hub. During the process of press-fitting the hub into the integral bearing, significant loads are applied which are transmitted through the rolling elements of the integral bearing. The rolling bearing elements and races are made from extremely hard materials and are designed to have a very small contact area between them. When the high press loads are imposed on the bearing unit, localized brinelling of the bearing elements at their raceway surfaces often occurs. Such brinelling causes a scoring or marking of the bearing rolling elements and races which have been found to ultimately become failure points in the bearing assembly after long use in the field. One aspect of the present invention is to overcome the problem of prior art assembly processes and machines which led to such localized brinelling. This advantage is principally achieved by causing relative rotation between the integral bearing inner and outer races during the press-fit process, which prevents the press fitting loads from being localized at specific surfaces; instead they are spread over a progressing contact area of the The assembly process and machine of the present surfaces between the hub and bearing which are engaged by a flexible lip seal, thus preventing unlubricated surfaces from abrading the lip seal early in its service life. The process further incorporates sensors to assure correct loading of the parts before pressing and for monitoring press-on loads to determine if the correct interference fit is provided in the component.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
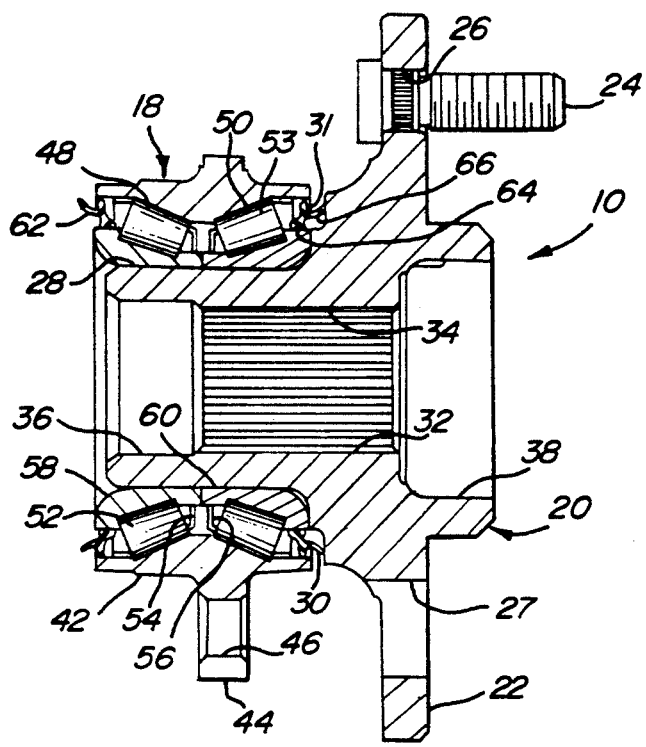
FIG. 1 is a cross-sectional view of an exemplary integral bearing unit which may be used in implementing the process and machine of this invention.
Figure 2:
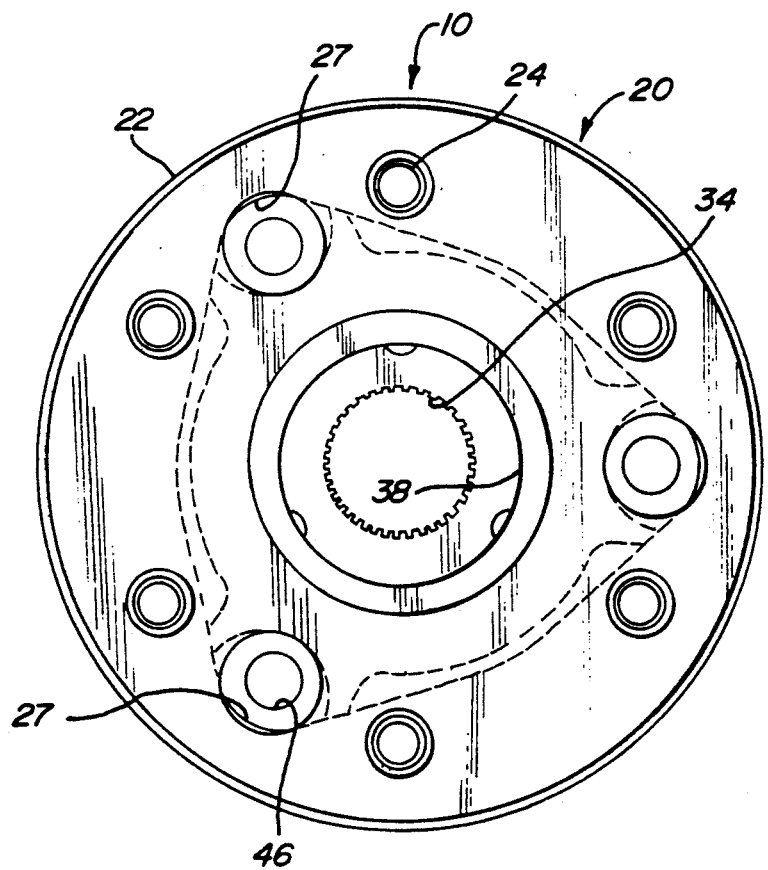
FIG. 2 is a side view of the assembly shown in FIG. 1.

As shown in the FIG. 1, a wheel hub assembly 10 is shown which is generally comprised of an integral bearing unit 18 and a wheel hub 20. Wheel hub 20 is generally cylindrical in shape, and has wheel mounting flange 22 with a number of wheel mounting studs 24 press-fit through holes 26. Wheel mounting flange 22 also defines an access hole 27 which is provided to facilitate mounting of hub assembly 10 onto an associated vehicle. The outer surface of wheel hub 20 has a precision formed barrel surface 28 upon which integral bearing 18 is pressed, as will be subsequently described in greater detail. Wheel hub 20 also defines a radial shoulder 30 which provides a surface which engages grease seal 31. Wheel hub 20 further has an internal bore 32 having a central splined portion 34 which receives a splined drive axle (not shown). Central bore 32 also defines enlarged bore sections 36 and 38.

Integral bearing unit 18, also best shown in FIG. 1 has a one-piece outer race shell 42. Shell 42 has a radially extending flange 44 having mounting bores 46 which receive fasteners (not shown) for mounting the assembly to the associated vehicle. Shell 42 also has a pair of conical surfaces 48 and 50 which define the outer races for the inboard and outboard bearings, respectively. A number of tapered roller elements 52 are positioned in a circular array in contact with inboard conical surface 48 to provide a conventional roller bearing. Likewise, a second set of tapered roller elements 53 contact conical surface 50. To facilitate assembly of the bearings and to prevent the rolling elements from contacting one another in operation, tapered rollers 52 and 53 are separated and retained by bearing cages 54 and 56, respectively.

The inner races for tapered rollers 52 and 53 are comprised of a two-piece assembly. Inboard cone 58 engages tapered rollers 52, whereas outboard cone 60 engages rollers 53. Cones 58 and 60 are separate components to facilitate assembly of bearing unit 18. In addition to seal 31, integral bearing unit 18 also includes an inboard grease seal 62. Both of the grease seals are press-fit into bearing shell 42. Grease seals 31 and 62 each have a pair of sealing lips including lips 64 which seal against cones 58 and 60. Axial lip 66 of seal 31 contacts radial hub surface 30. In order to provide quiet and secure operation, it is necessary for cones 58 and 60 to be press-fit (i.e. interference fit) onto hub barrel surface 28. As mentioned previously, this invention is a process and machine for accomplishing such an assembly operation.

Figure 3:
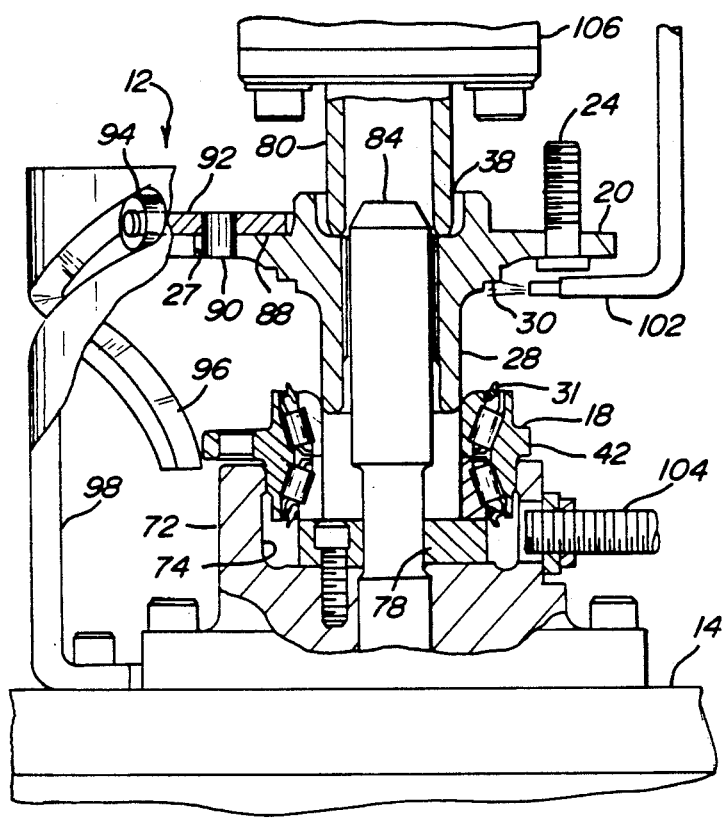
FIG. 3 is a pictorial view of a hub being pressed onto an integral bearing at an initial state of the process of the present invention and further showing the machine of this invention.
Figure 4:
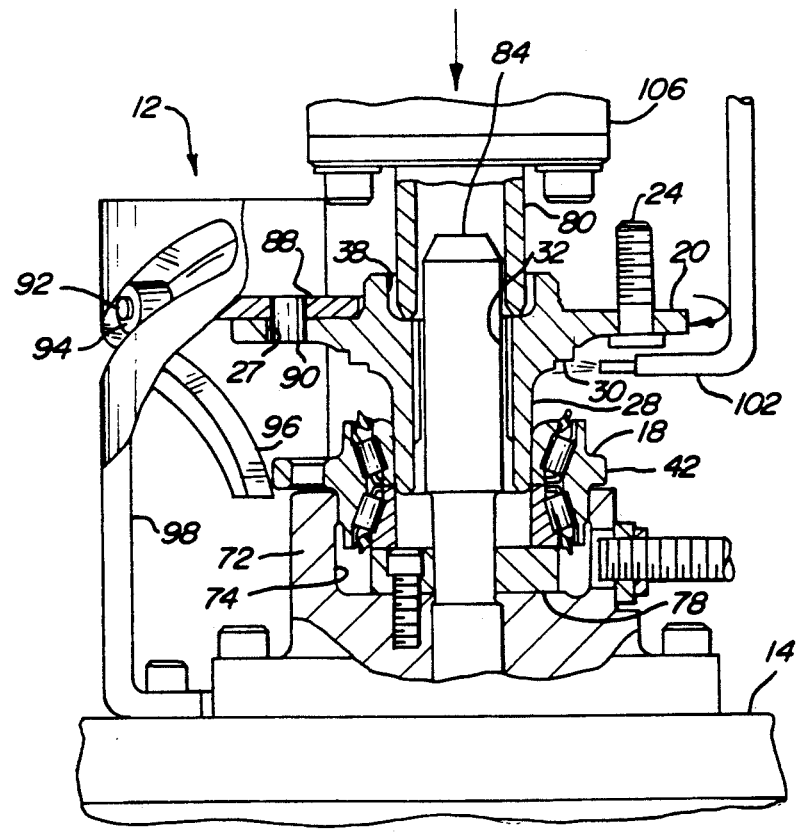
FIG. 4 is similar to FIG. 3 but showing the process at an intermediate stage.
Figure 5:
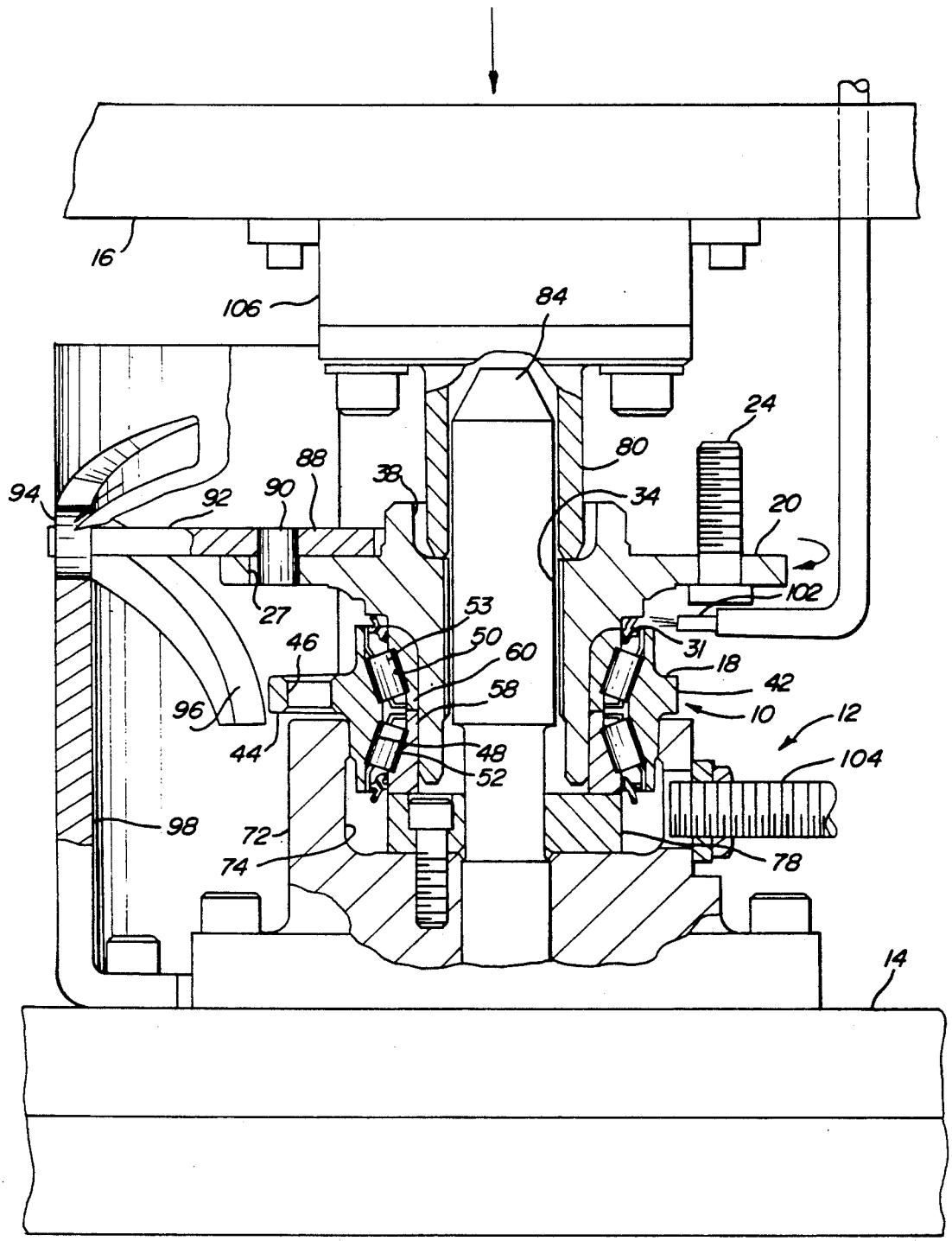
FIG. 5 is similar to FIG. 3 but showing the process at a final stage at which the hub is fully pressed into the bearing.

FIGS. 3, 4 and 5 illustrate a machine generally represented by reference number 12 which performs the process in accordance with this invention. Machine 12 is an assembly press including a lower platen 14 and an upper platen 16 which are moveable toward and away from one another in response to hydraulic pressure or another actuator.

Machine 12 further includes fixtures for positioning bearing unit 18 and hub 20. Lower platen 14 includes assembly tooling which includes a cup shaped tool 72 which receives integral bearing unit 18 in a nesting relationship. Tool 72 also has an inside cylindrical surface 74 which locates the outer cylindrical surface of bearing unit 18. Pressing ring 78 is positioned within tool 72 to engage the end surface of inboard bearing cone 58, as shown in the Figures. The upper surface of ring 78 is high enough so that bearing mounting flange 44 does not support the bearing assembly when pressing loads are applied during assembly. Instead, these loads are carried predominantly by ring 78.

Additional tooling 80 is affixed to assembly press upper platen 16 and serves to position and support wheel hub 20 during assembly. Tooling 80 comprises an extending hollow post having an end surface which engages with the hub at the shoulder between bore sections 32 and 38. Mandrel 84 can be connected to either the upper or lower platen but is shown in the Figures affixed to lower platen 14, and serves to radially locate wheel hub 20. It is not necessary that such radial location be precise since the parts being press-fit together self-align during assembly.

Machine 12 also includes a mechanism for engaging wheel hub 20 and causing it to rotate during the pressing process. This mechanism includes drive ring 88 which has one or more posts 90 which fit into hub access holes 27. Drive ring 88 further has a radially extending arm 92 having a cam follower roller 94. Roller 94 engages a helical surface 96 defined by cam 98, which is provided to cause rotation to hub 20 during assembly, as will be subsequently explained in detail.

In addition to elements for positioning the parts before and during assembly, machine 12 further incorporates elements to insure proper loading of the parts and monitoring functions to assure quality control and assessment of the assembly process. Proximity probe 104 is provided to indicate if bearing unit 18 is loaded upside-down on tooling 72. From the figures, it will be noted that bearing mounting flange 44 is positioned closer to one axial end of the bearing than the other, thus defining a short barrel section extending from one side of the flange and a long barrel section extending from the other. Properly loaded, the long barrel portion is loaded down into tool 72. If improperly loaded with the short barrel section down the hub would not extend downwardly to the extent to be sensed by proximity probe 104, which can be connected to an alarm circuit, notifying the operator of the incorrect loading.

Another feature of machine 12 is the provision of load cell 106 which outputs the pressing loads being applied between the platens. A proper interference fit between hub surface 28 and cones 58 and 60 will produce an output of load versus platen displacement which defines a "signature" trace correlatable to a "good" fit. This good fit is critical in maintaining product function and bearing integrity. Traces outside of the "good fit" signature can be monitored and used to reject faulty parts or tooling defects, or used to detect upstream production problems such as undesigned hubs or oversized bearing cones or production trends.

The assembly process of this invention will now be explained with reference to FIGS. 3, 4 and 5. Starting with FIG. 3, bearing unit 18 and wheel hub 20 are separate components. Bearing unit 18 is loaded onto tool 72 and hub 20 is positioned over it. In order to assure lubrication of seal 31, a small amount of grease is applied by nozzle 102. As mentioned previously, if bearing unit 18 is loaded in an inverted orientation, an output is generated to notify the operator so that corrective measures can be taken. Thereafter, upper platen 16 is lowered into position causing mandrel 84 to pass into the central bore 32 of the hub. Upper platen 16 is then actuated to forcedly press hub 20 downwardly into frictional engagement with the inside surface of bearing cones 58 and 60. As hub barrel surface 28 engages outboard cone 60, the assembly forces are transmitted through one set of tapered rollers 53 into outer shell 42, through rollers 52 and then into inboard cone 58. As the platen 16 is lowered, cam follower roller 94 engages helical surface 96 which causes hub 20 to rotate as it moves downwardly. This rotation is transmitted through integral bearing unit 18, causing tapered rollers 52 and 53 to rotate and travel along their races during the assembly process. This relative rotation prevents the assembly forces from being transmitted strictly at point contact areas between rollers 52 and 53, and their mating bearing surfaces. As mentioned previously these forces can cause localized brinelling of the contact surfaces. Instead, according to the invention the contact forces are spread over advancing contact lines between the rolling elements and races thus creating bearing contact lines after assembly which have a more consistent surface character, as opposed to localized brinelling.

FIG. 4 shows the elements in an intermediate step of assembly, and FIG. 5 shows the elements in their final resting position. During the pressing operation, the output from load cell 106 is monitored to provide quality control, as mentioned above.

While the above description constitutes the preferred embodiments of the present invention, it will be appreciated that the invention is susceptible of modification, variation and change without departing from the proper scope and fair meaning of the accompanying claims.

I claim:

1. A process of assembling a motor vehicle wheel hub assembly in which a hub is press fit into an integral wheel bearing unit; said hub of the type having a precision formed external cylindrical surface which is pressed into said bearing unit and said bearing unit of the type having an outer race and an inner race with rolling elements therebetween and said inner race defining an inside cylindrical surface receiving said hub, said process comprising the steps of:

provding a press having a lower platen and an upper platen which are movable toward and away from one another;

supporting said bearing unit relative to one of said platen such that press forces can be transmitted to said inner race;

supporting said hub relative to the other of said platens;

locating said bearing unit and said hub relative to one another such that movement of said platens toward one another will cause said bearing and said hub to be pressed together;

actuating said press to force said platens together causing press loads to be transmitted through said hub, and through said bearing outer race, rolling elements and said inner race;

simultaneously with said actuating step, rotating said hub relative to said bearing outer race, causing said bearing rolling elements to move and progress relative to said bearing inner and outer races thereby causing said press loads transmitted through said bearing unit to be spread over progressing contact areas between said bearing rolling elements and inner and outer races as said bearing roller elements move and progress.

2. A process as set forth in claim 1 wherein said bearing unit further includes a grease seal engageable with said hub and further comprising the step of applying a lubricant to said seal prior to said seal being engaged with said hub.

3. A process as set forth in claim 1 further comprising the step of monitoring the press forces applied between said upper and lower platen in a manner to measure the frictional forces acting between said hub and said bearing unit.

4. A process as set forth in claim 1 further comprising the step of monitoring the orientation of said bearing unit prior to actuating said press and outputting a signal when said bearing unit is located in an inverted orientation.

* * * * *